Sept. 20, 1960                W. A. PFAFF                2,953,061
                                CAMERA
Filed June 20, 1956                                  4 Sheets-Sheet 1
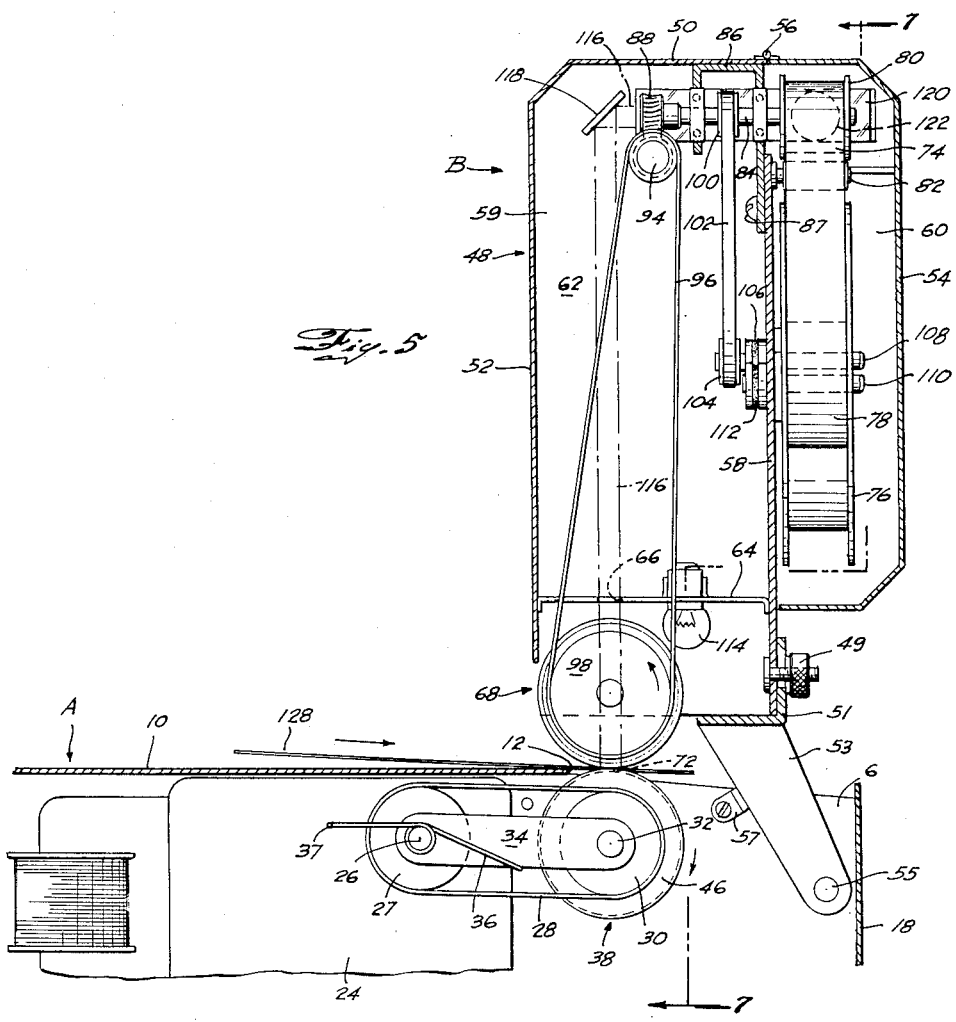
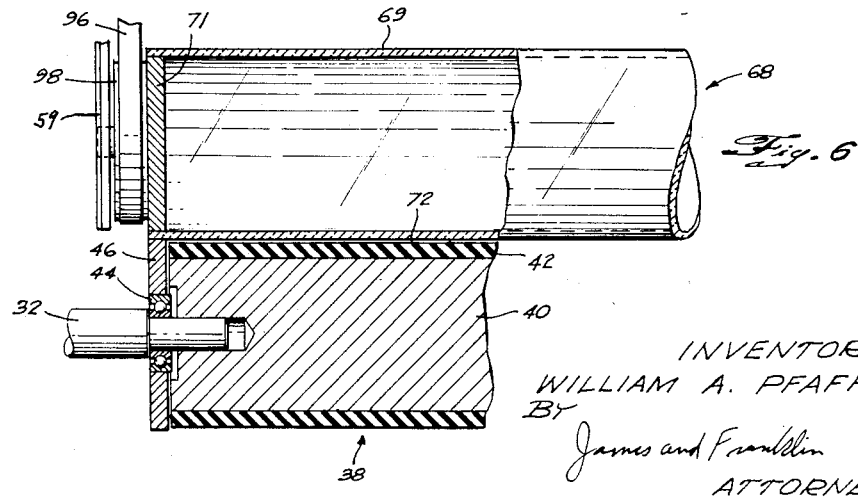
INVENTOR
WILLIAM A. PFAFF
BY
James and Franklin
ATTORNEYS.

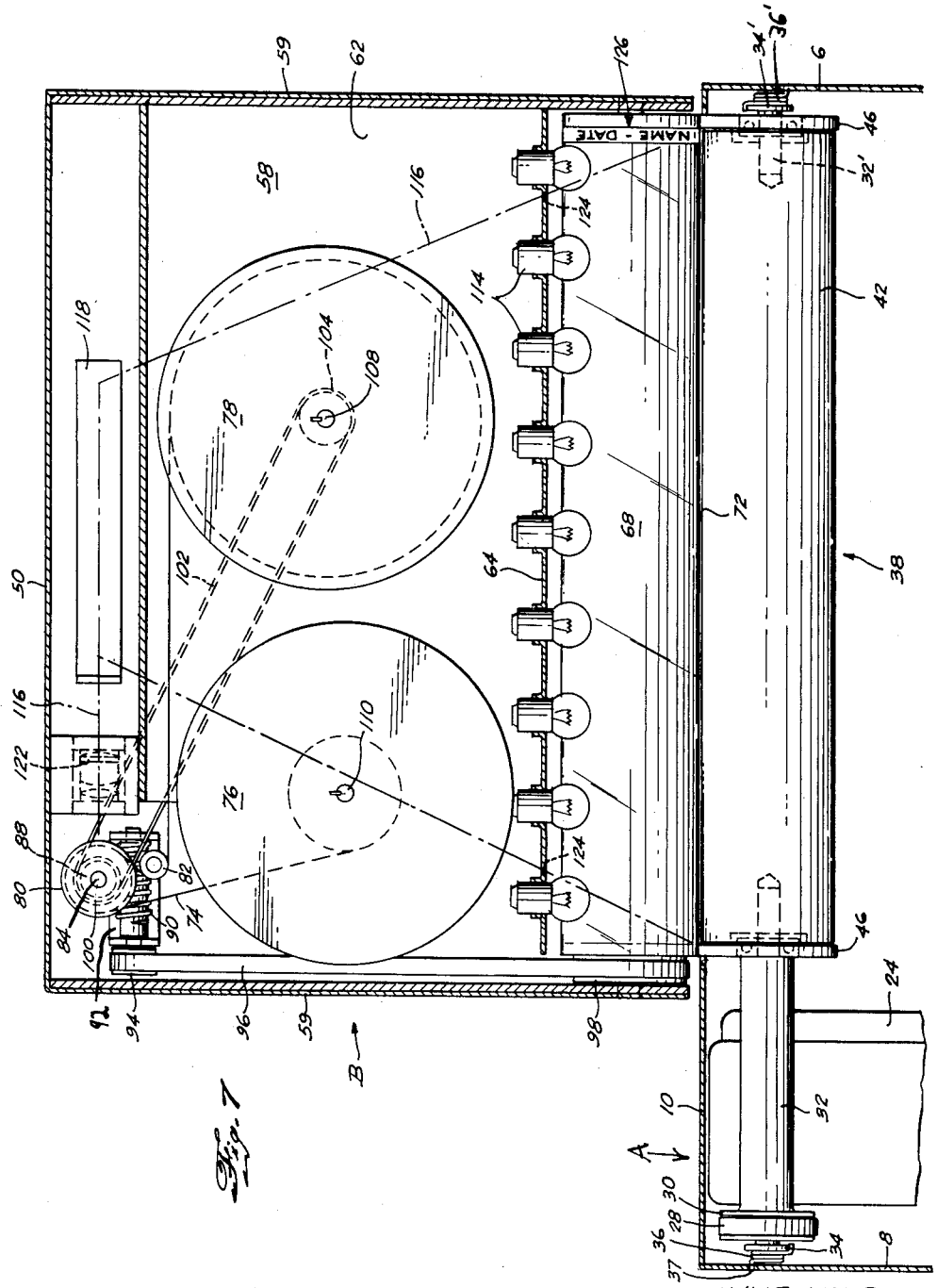

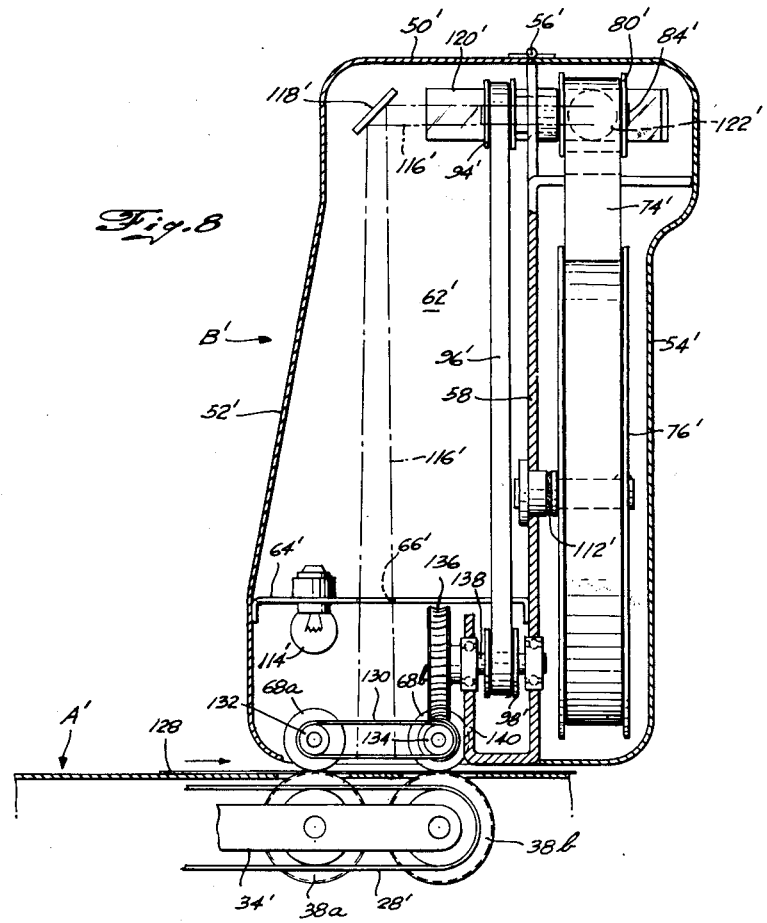
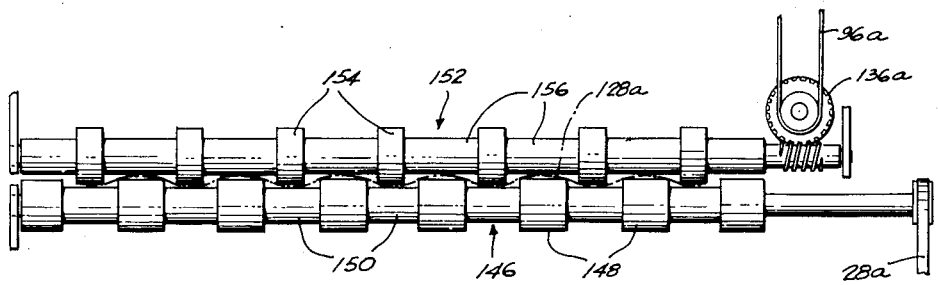

Sept. 20, 1960 W. A. PFAFF 2,953,061
CAMERA
Filed June 20, 1956 4 Sheets-Sheet 4
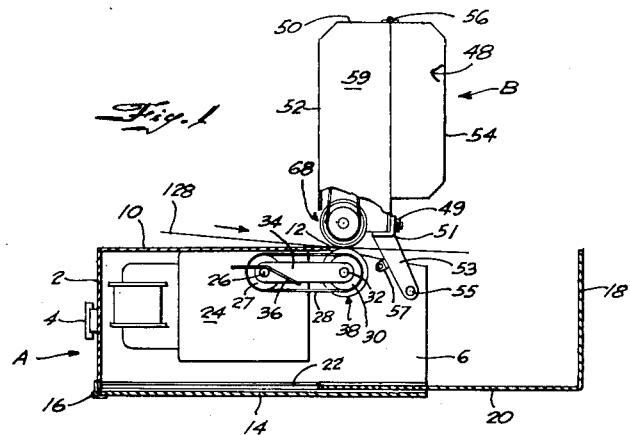
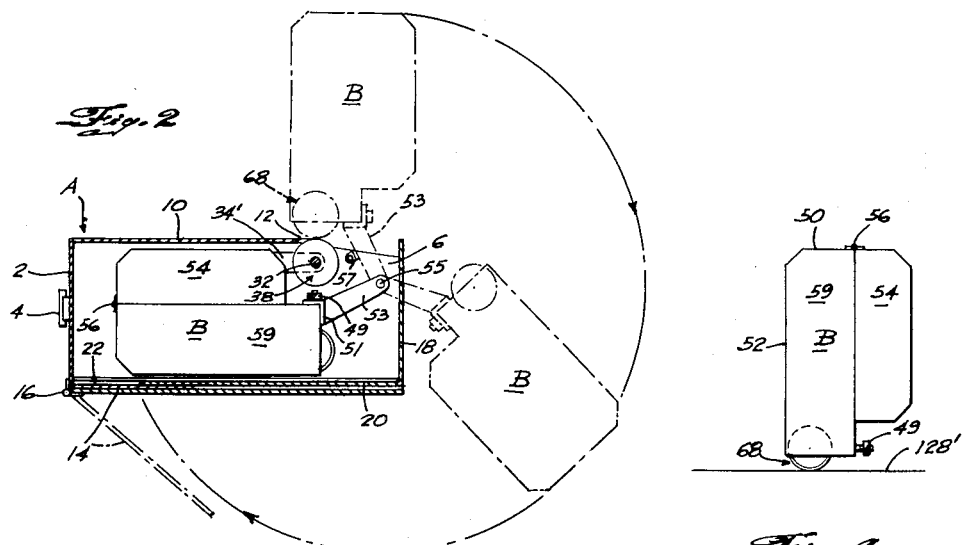
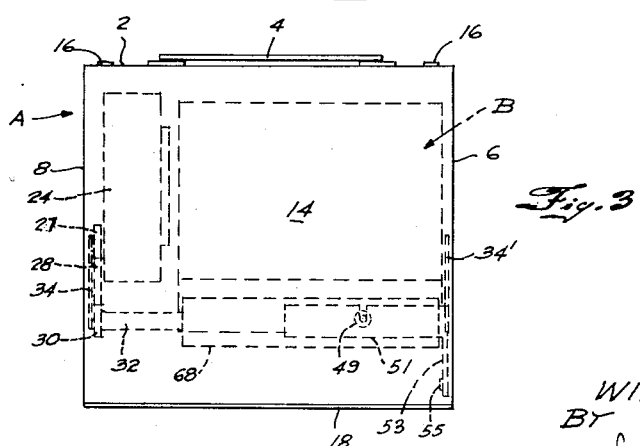
INVENTOR.
WILLIAM A. PFAFF
BY James and Franklin
ATTORNEYS.

United States Patent Office 2,953,061
Patented Sept. 20, 1960

2,953,061
CAMERA
William A. Pfaff, Rte. 5, Box 293, Huntington, N.Y.
Filed June 20, 1956, Ser. No. 592,619
20 Claims. (Cl. 88—24)

The present invention relates to a camera for reproducing sheets or the like. In its more specific aspects it relates to such a camera in which means are provided for synchronizing movement of the film with movement of the sheet being reproduced, and to the operative association of the film feeding means with a power driving means which is also effective to move the sheet being reproduced. Another specific aspect of the present invention relates to the mounting of such a camera on a housing so that the camera may be moved between an inoperative position within the housing and an operative position on the housing. The invention further relates to a reproducing camera in which a transparent roller is adapted to engage the sheet to be reproduced and to move therewith, the optical system of the camera having a path which passes through that roller from the sheet being reproduced.

Cameras of the type under discusison, which are usually but not necessarily of the microfilm type, generally function by viewing the sheet to be reproduced along a narrow strip or slit, the sheet being moved past the slit and the film being moved through the camera in synchronism therewith so that continuous reproduction of the sheet on the film is effectuated. In some embodiments a motor drive is provided for moving the film and the sheet, that motor drive always being operatively connected to the film feeding means in the camera. In other known embodiments the camera is of the hand operated type, the sheet, when moved relative to the camera for reproducing purposes, engaging and moving an element extending from the camera, that element in turn actuating the film feeding means.

In accordance with one aspect of the present invention the operative connection between the power drive and the film feeding means is adapted to be completed by the reproduced sheet itself. Thus the power drive may be continuously operated, placing the machine constantly in condition for power feeding of sheets therethrough, but the film will be fed through the camera only while a sheet is actually moving through the reproducing station. To this end a movable sheet feeding element driven by the power drive is operatively spaced from a film driving element associated with the film feeding means, the spacing being substantially that of the thickness of the thinnest sheet to be reproduced. Hence movement of the sheet feeding element does not result in movement of the film driving element unless and until a sheet to be reproduced is inserted therebetween. When this occurs, however, the sheet feeding element will not only feed the sheet through the device but will also cause the film driving element to move and hence will cause film to be fed through the camera in synchronism with movement of the sheet reproduced.

In the form here specifically disclosed the sheet feeding element and, when provided, the motor drive therefor, are mounted within a housing which is also adapted to receive the camera for storage purposes. When the camera is to be used it is moved from its inoperative storage position within the housing to an operative position on the housing, the camera when in operative position having the film driving element carried thereby properly positioned with respect to the sheet feeding element as above described.

The camera proper, including the film driving element, may constitute a unit useable independently of the sheet feeding element and power drive. When this is the case it is advantageous to so mount the camera on the housing that it may be detached therefrom and used independently of the housing and power drive by being manually moved over a sheet to be reproduced. This is particularly advantageous when the item to be reproduced is too thick to be passed between the sheet feeding element and the film driving element when the camera is attached to the housing, as when a page of a book is to be reproduced.

When the camera is used with the power drive and housing, the housing may advantageously be constructed so that a wall thereof may serve as a table over which the sheet to be reproduced may slide as it moves to the reproducing station, and the housing may also be provided with a telescoping portion which can function as a tray to receive the sheets after they have passed through the reproducing station.

In accordance with one embodiment here specifically illustrated, the film driving element on the camera which is adapted to engage the sheet being reproduced and to move therewith is transparent, and the optical path from the narrow strip of the sheet which is being reproduced at any given moment to the film passes through that roller. This has several advantages. In the first place, the film will be fed through the camera only when the sheet is in reproducing position, and hence no film is wasted. In the second place, the sheet, over the area actually being reproduced at any given moment, is pressed and held flat, thus ensuring accuracy of reproduction. In the third place the cylindrical transparent roller may be so designed, where desired, as to function as a cylindrical lens which causes a distortion of the image in one direction, thus conserving film space. The advantages of this effect are described in Patent 2,633,057, entitled "Microfilm Camera," of which I am co-inventor.

The entire structure, including both the camera per se and the housing, power drive and sheet feeding element, are simple and inexpensive in construction and are relatively foolproof in operation.

To the accomplishment of the above, and to such other objects as may hereinafter appear, the present invention relates to a camera structure as defined in the appended claims and as described in this specification, taken together with the accompanying drawings in which:

Fig. 1 is a side elevational view, partially broken away and cross sectioned, showing one embodiment of the present invention with the camera and housing in operative positions;

Fig. 2 is a side cross sectional view showing the camera in its position stored within the housing, the movement of the camera between stored and operative positions being indicated in broken lines;

Fig. 3 is a bottom plan view of the housing and camera with the camera in housed position;

Fig. 4 is a side elevational view showing the manner in which the camera unit, when detached from the housing, may be used as an independent hand manipulated reproducer.

Fig. 5 is a side cross sectional view, on an enlarged scale, of the camera and housing in their operative positions;

Fig. 6 is a side elevational view on an enlarged scale, partially broken away and cross sectioned, showing details of construction of the sheet feeding roller and the film driving roller and the manner in which they are operatively associated and spaced from one another;

Fig. 7 is a cross sectional view on an enlarged scale taken along the line 7—7 of Fig. 5;

Fig. 8 is a view similar to Fig. 5 but showing a specifically different camera embodiment; and Fig. 9 is a side elevational view of an alternative embodiment of a sheet feeding roller and a film driving roller.

Having reference first to the embodiment of Figs. 1–6, the housing, generally designated A, comprises an end wall 2 to which a carrying handle 4 may be attached, side walls 6 and 8 and a top wall 10 which is somewhat shorter in length than the side walls 6 and 8 and which terminates in edge 12. A bottom wall 14 is pivotally secured to the end wall 2 in any appropriate manner, as by means of the hinges 16, so as to be movable between the closed position shown in Fig. 1 and in solid lines in Fig. 2, closing the bottom of the housing A, and an open position indicated in broken lines in Fig. 2 exposing the bottom of the housing A. Any appropriate means may be provided to detachably retain the bottom wall 14 in its closed position. The bottom wall 14 carries an end wall 18 adapted to close the right hand end of the housing A. As here specifically disclosed the end wall 18 has a horizontal panel 20 secured thereto and slidable over the bottom wall 14 within rails 22 so as to be movable between the extended position shown in Fig. 1 and the contracted position shown in Fig. 2.

Mounted within the housing A is an electric motor generally designated 24, that motor preferably being positioned to one side of the interior of the housing A adjacent the side wall 8. The motor has an output shaft 26. Pulley 27 is fast on the shaft 26 and is connected by means of belt 28 to pulley 30 mounted on shaft 32, the shaft 32 in turn being carried by one end of the arm 34 the other end of which is pivotally mounted on pulley shaft 26. The arm 34 is urged in a counter-clockwise direction about the shaft 27 by means of biasing spring 36 one end 37 of which is fixed to the side wall 8.

Mounted on the shaft 32 for rotation therewith is the sheet feeding element generally designated 38. It here takes the form of a roller 40 preferably covered by a layer 42 of rubber or other frictional material. The sheet feeding element 38 is so positioned that it extends beyond the edge 12 of the housing top wall 10, the spring 36 being effective to urge the sheet feeding element 38 upwardly so that its periphery may extend above the wall 10. Independently rotatably mounted on the shaft 32, as by means of bearing 44 (see Fig. 6), at each end of the sheet feeding element 38, is a flange 46, the diameter of the flange 46 being somewhat greater than the diameter of the sheet feeding element 38, the difference in diameters being substantially equal to twice the thickness of the thinnest sheet to be reproduced. The end of the element 38 adjacent the housing side wall 6 is provided with a stub shaft 32' which passes through a bearing 44 on which a flange 46 is rotatable and is journalled in an arm 34' corresponding to the arm 34 at the other end of the element 38 and correspondingly pivotally mounted, as on the side wall 6, and biased by spring 36'.

The camera proper, generally designated B, comprises a housing 48 adapted to be detachably secured, by means of thumb screw 49, to bracket 51 extending from an arm 53 pivotally mounted at 55 near the right hand end of the side wall 6 of the housing A. When the bottom wall 14 of the housing A is moved to its open position shown in broken lines in Fig. 2 the camera B may be pivoted between its stored or inoperative position shown in Fig. 3 and in solid lines in Fig. 2 and its operative position shown in Fig. 1. The housing side wall 6 may be provided with a bracket 57 defining a positive stop for the arm 53 when the camera B is in its operative position.

The internal construction of the camera B may best be seen from reference to Figs. 5 and 7. The camera housing 48 comprises a top wall 50, a front wall 52, side walls 59, and a rear shell 54, the latter being pivotally secured to the top wall 50 as by means of hinges 56. A vertical partition 58 divides the camera B into a film compartment 60 within the rear shell 54 and what may be termed a viewing compartment 62. The viewing compartment 62 has, adjacent its lower end, a transverse partition 64 having a narrow elongated slot 66 therein. The lower end of the viewing compartment 62, beneath the partition 64, is open, and a film driving element generally designated 68, here shown in the form of a transparent roller of glass or the like, is rotatably mounted therein between the depending portions of the camera housing side walls 59. The width of the roller 68 is greater than the width of the sheet feeding roller 38 so as, when the camera B is in operative position, to engage and rest upon the flanges 46 at each end of the sheet feeding element 38. Hence the rollers 68 and 38 will have a space 72 defined between them, the height of that space being substantially that of the thickness of the thinnest sheet to be reproduced.

The film 74 extends from a supply reel 76 to a takeup reel 78, and in passing from one to the other extends around pulley 80 and guiding roller 82, all of the elements 76–82 being mounted in the film compartment 60 in any appropriate manner. The pulley 80 is mounted on shaft 84 which is journalled in bracket 86 attached to the partition 58 at 87 and which extends into the viewing compartment 62, there carrying a worm wheel 88 which meshes with worm 90 supported in any suitable manner, as by the bracket 92. Rotatable with the worm 90 is a pulley 94 which is connected by belt 96 to a pulley 98 at one end of the film driving roller 68 and rotatable therewith. A pulley 100 rotatable with the shaft 84 is connected by belt 102 to pulley 104, which is in turn connected, by means of friction clutch 106, to the shaft 108 of the takeup reel 78, that shaft passing through the partition 58. The shaft 110 of the supply reel 76 is also mounted on the partition 58 and is connected thereto by means of friction clutch 112. Hence it will be seen that the takeup reel 78 and the pulley 80 will be driven to draw film from the supply reel 76 to the takeup reel 78 whenever the film driving roller 68 rotates, and that the film 74 will be stationary whenever the film driving roller 68 is stationary.

The optical system of the camera is as follows. A bank of bulbs 114 are mounted on the partition 64 so as to extend across the width of the camera B and are adapted to be illuminated in any appropriate manner. The circuitry and switches for control of illumination of the bulbs 114 is omitted in the drawings for purposes of simplicity and clarity of illustration of the novel portions of this invention. The bulbs 114 are also positioned close to the periphery of the transparent film driving roller 68. Light from the bulbs 114 is adapted to pass through the roller 68 to the surface of the sheet being reproduced, that light being reflected from that sheet back through the roller 68 toward the partition 64. Only a certain portion of that light will pass through the slot 66 in the partition 64, and hence at any given instant only a narrow elongated portion of the sheet will be effective for reproduction. The light beam which passes through the slot 66 is indicated by the broken lines 116 in Figs. 5 and 7. That beam 116 is reflected and partially converged by mirror 118, is again reflected and partially converged by a second mirror 120 and then passes through lens assembly 122, by which it is projected onto the film 74 as it passes over the roller 80. As may be seen from Fig. 7, the length of the slot 66, as indicated by the lines 124, is somewhat less than the length of the film driving roller 68, so that the light beam 116 constitutes only of light reflected through the lowermost portion of the roller 68.

When a transparent roller 68 is employed one end of that roller may advantageously be employed as a data ring. Thus, as disclosed in Fig. 7, the periphery of the roller 68 adjacent one end thereof, over a ring-like area generally designated 126, may be roughened or otherwise treated so that indicia may be written thereon. Such indicia may, for instance, be the title of the object being reproduced and the date of reproduction. Since a portion of the light beam 116 will pass through the area 126 of the roller 68, those indicia will, as the roller 68 rotates, be photographically reproduced on the film 74, thus providing a permanent record of the indicia.

When the camera B is in its operative position on the housing A, with the film feeding roller 68 engaged with the flanges 46, the motor 24 may be energized so that the sheet feeding roller 38 is rotated. Because of the space 72 between the rollers 38 and 68, and because the flanges 46 are independently rotatable relative to the shaft 32, the film feeding roller 68 will remain stationary, and hence the film 74 will not be fed through the camera. The sheet to be reproduced, generally designated 128, may then be placed on the top wall 10 of the housing A and manually moved toward the camera B, the top wall 10 thus functioning as a feed shelf for the sheet 128. The sheet 128 is adapted to be passed between the rollers 38 and 68. The roller 68 will remain stationary until the leading edge of the sheet 128 actually enters the space 72 between the rollers 38 and 68. As soon as this occurs, however, the motor driven roller 38 will grip the sheet 128 and move it through the reproducing station at the desired speed. At the same time the sheet 128 will itself operatively connect the rollers 38 and 68, thus causing the latter to be driven by the former and consequently causing the film 74 to be moved through the camera at a speed exactly synchronized with the speed of movement of the sheet 128 through the reproducing station. As soon as the trailing edge of the sheet 128 passes the rollers 38 and 68 the roller 68 will come to a stop, and will not again drive the film 74 until the moment that the leading edge of a new sheet 128 enters the reproducing zone. Thus there is substantially no wastage on the film 74.

It will be further noted that the strip area of the sheet 128 which is being reproduced at any given moment is closely pressed between the rollers 38 and 68 so that accuracy of reproduction will always be maintained.

Because of the biasing spring 36, it will be appreciated that sheets of varying thicknesses may be reproduced, the spring 36 yielding to permit the sheet feeding roller 38 to move downwardly in accordance with the thickness of the sheet 128.

A further advantage of the use of the transparent roller 68 is that the roller may be designed to act to an appreciable extent as a cylindrical lens which condenses the image of the strip being reproduced in a direction corresponding to the length of the film 74. Hence film economy as maximized since the reproduced image is "squeezed" in the direction of the length of the film. Reproduction of the photographic image may be accomplished by reproducing it through a similar cylindrical lens.

In the form here specifically disclosed in Fig. 6 the film feeding roller 68 is defined by a relatively thin glass cylinder 69 supported at either end by a disk 71 received within the cylinder 69, the pulley 98 preferably being integral with the disk 71. With this form of construction the roller 68 will function as a cylindrical lens only to a very minimal degree, and hence the "squeezing" of the reproduced image will not occur to any appreciable extent. However, if the roller 68 be defined by a solid glass rod 73, as specifically shown in Fig. 7, or if the thickness of the cylinder 69 of the embodiment of Fig. 6 be increased, the aforementioned "squeezing" effect will be appreciable, nad the advantages attendant thereupon will obtain.

When, as shown in Fig. 1, the end wall 18 of the housing A is pulled out, the end of the panel 20 to which it is attached will constitute a tray into which the sheets 128 will fall as they are reproduced.

When the camera B is detached from the bracket 52, as by unscrewing the thumb screw 50, it will be appreciated that it may be used as a hand-held camera adapted to be manually rolled over a surface 128' to be reproduced, as shown in Fig. 4.

Fig. 8 discloses a camera B' having a specifically different film driving means. There the camera B' is provided with a pair of spaced rollers 68a and 68b operatively connected at one end by means of a belt 130 and pulleys 132 and 134 respectively. The roller 68b turns a worm which meshes with a worm wheel 136 fast on shaft 138 journaled in bracket 140. Also fast on the shaft 138 is a pulley 98' which is connected, by means of belt 96', to pulley 94'. The remainder of the film driving mechanism may be substantially the same as that disclosed in the previous embodiment. In the camera B' the lamps 114' are mounted on partition 64'. The area of the sheet 128 which is reproduced is defined by a slot 66' formed in partition 64'. In this embodiment the rollers 68a and 68b constitute the film driving elements which are adapted to be operatively connected to the sheet feeding rollers 38a and 38b by means of the reproduced sheet 128. It will be noted that since the roller 68a is positioned in advance of the reproducing area, the film 74 will start to be driven before the leading edge of the sheet 128 actually reaches the reproducing station. It will be noted that in the embodiment of Fig. 8 a pair of driven sheet feeding rollers 38a and 38b are provided, both mounted on the arm 34' and each engaged respectively with the film feeding rollers 68a and 68b. This is desirable in order that the sheet 128 might continue to be power-fed completely through the reproducing station even after its trailing edge has passed beyond the rollers 38a and 68a. With this arrangement, however, the roller 68b will continue to be rotated for a short time after the trailing edge of the sheet 128 has passed the reproducing station defined by the slot 142. Thus it will be seen that in the embodiment of Fig. 8 there will be gaps on the film 74' between the reproductions of individual sheets, whereas such will not be the case in the previously described embodiment. Of course, if the second sheet feeding roller 38b were omitted, the sheet 128, after its trailing edge has passed beyond the rollers 38a and 68a could be manually pulled through the last part of its movement past the reproducing station. However, this might result in over-exposure of the trailing portion of the sheet 128. It will be understood that the camera B' of Fig. 8 can be used as an independent hand-manipulated reproducer in the same manner as the camera B of Fig. 7.

In both of the previously described embodiments the surfaces of the sheet feeding roller 38 and the film driving roller 68 were even, and those surfaces were equidistantly spaced from one another at their nearest point of approach. Fig. 9 is a semi-schematic representation of an alternative way in which such rollers could be configured so that normal rotation of one would not be imparted to the other but so that the interposition of a sheet 128a therebetween would operatively connect the two rollers for simultaneous rotation. This particular mode of construction has the advantage that the parts need not be manufactured to such close tolerances as in the preceding embodiments. In Fig. 9 the lower roller 146, corresponding to the sheet feeding roller 38, is provided with portions 148 of increased diameter alternating with portions 150 of reduced diameter. The upper roller 152, corresponding to the film feeding roller 68, is provided with portions 154 of increased diameter alternating with portions 156 of reduced diameter. The rollers 146 and 152 are so positioned that the portions of increased diameter of any one roller come opposite the portions of reduced diameter of the other roller, and in each case the width of the portions of reduced diameter of a given roller is greater than the width of the portions of increased diameter of the other roller. Consequently, although the rollers 146 and 152 may be positioned with their axes of rotation closer to one another than the combined radii of their respective portions of increased diameter 148 and 154, rotation of the roller 146 will not be transmitted to the roller 152 provided that their axes of rotation are spaced from one another by a distance exceeding the sum of the radius of the portion of increased diameter 148 or 154 of any one of the rollers and the radius of the portion of reduced diameter 150 or 156 of the other roller. However, when a sheet 128a, represented by the dot-dash lines in Fig. 9, is interposed between the rollers, it will assume a sinuous shape, as shown, and hence will operatively connect the two rollers so that the roller 152 will be driven by the roller 146.

In connection with the first described embodiment an optical system has been disclosed in which light passes from the bulbs 114 through the transparent roller 68 to the surface of the sheet being reproduced, and is then reflected from that surface back through the transparent roller to the remainder of the optical system. It will be understood that this is merely exemplary, and that the advantages of the use of a transparent roller would also be present in connection with specifically different optical system, for example, by causing the sheet to be reproduced to pass over a translucent or transparent table at the reproducing station, a source of illumination being positioned on the other side of the translucent sheet from the sheet being reproduced. With this organization light would pass directly through the sheet being reproduced to the transparent roller and then through that roller to the remainder of the optical system. Other variations will suggest themselves. In connection with the use of a data ring 126, it will be understood that the indicia could be applied either to the interior or to the exterior of the glass cylinder 69, particularly when that cylinder is of normal thickness.

While but a limited number of embodiments of the present invention have been here disclosed, it will be apparent that many variations may be made therein. The sheet feeding element 38 might take some form other than a roller. For example, it might be a belt. The sheet feeding element 38 could be hand-powered or powered in some way other than by a self-contained electric motor. The spacing between the sheet feeding element 38 and the film feeding element 68 could be accomplished in various ways. The manner in which the camera B is mounted on the housing A may be widely varied. The internal constructions of the camera B as here disclosed are but typical of many which might be employed. These assemblies are but typical of the many ways in which the mechanical and optical arrangements of the units under discussion may be altered without departing from the spirit of the invention as defined in the following claims.

I claim:

1. A camera for reproducing sheets or the like comprising a housing, a movable sheet feeding element in said housing, a camera operatively positionable with respect to said housing and comprising means for feeding film, a movable film driving element operatively associated with said film feeding means for driving said film feeding means whenever said film driving element is moved, said sheet feeding element and said film driving element, when said camera and housing are operatively relatively positioned, being normally operatively disconnected from one another and spaced from one another by a distance substantially that of the thickness of the thinnest sheet to be reproduced, whereby when said sheet is introduced between said elements said sheet engages and operatively connects both said elements, said feeding element thus driving said sheet and said film driving element.

2. A camera for reproducing sheets or the like comprising a housing, a power-driven movable sheet feeding element in said housing, a camera operatively positionable with respect to said housing and comprising means for feeding film, a movable film driving element operatively associated with said film feeding means for driving said film feeding means whenever said film driving element is moved, said sheet feeding element and said film driving element, when said camera and housing are operatively relatively positioned, being normally operatively disconnected from one another and spaced from one another by a distance substantially that of the thickness of the thinnest sheet to be reproduced, whereby when said sheet is introduced between said elements said sheet engages and operatively connects both said elements, said feeding element thus driving said sheet and said film driving element.

3. A camera for reproducing sheets or the like comprising a housing, a motor therein, a rotatable sheet feeding element therein driven by said motor, a camera positioned on said housing and having a space between it and said housing so that a sheet to be reproduced may be passed therebetween, film feeding means in said camera, a rotatable film driving element in said camera adjacent said space and operatively connected to said film feeding means for driving said film feeding means whenever said film driving element is rotated, said sheet feeding element also being adjacent said space and operatively displaced and normally operatively disconnected from said film driving element so that said space is defined at least in part between said elements, the spacing between said elements being substantially that of the thickness of the thinnest sheet to be reproduced, whereby when said sheet is introduced between said elements said sheet engages and operatively connects both said elements, said feeding element thus driving said sheet and said film driving element.

4. The camera of claim 1, in which said elements each comprise rollers, one of said rollers having flanges at each end thereof with respect to which it is independently rotatable, the radius of said flanges exceeding the radius of said one of said rollers by substantially the thickness of the thinnest sheet to be reproduced, the other of said rollers engaging said flanges.

5. In the camera of claim 1, means biasing one of said elements toward the other, and stop means engageable with said one of said elements for limiting its approach to said other of said elements to said distance.

6. The camera of claim 1, in which said elements comprise rollers, one of said rollers having flanges at each end thereof with respect to which it is independetnly rotatable, the radius of said flanges exceeding the radius of said one of said rollers by substantially the thickness of the thinnest sheet to be reproduced, the other of said rollers engaging said flanges, one of said rollers being biased toward the other of said rollers.

7. The camera of claim 1, in which said elements each comprise rollers, one of said rollers having flanges at each end thereof with respect to which it is independently rotatable, the radius of said flanges exceeding the radius of said one of said rollers by substantially the thickness of the thinnest sheet to be reproduced, the other of said rollers engaging said flanges, the roller in said housing being biased toward the roller in said camera, whereby sheets of different thickness may be reproduced.

8. The camera of claim 1, in which said camera is detachable from said housing, said film driving element extending at least partially from said camera, whereby said camera, when detached, can be used as an independent hand-manipulated producer.

9. The camera of claim 1, in which said camera is articulately mounted on said housing so as to be movable between an inoperative position within said housing and an operative position extending from said housing.

10. The camera of claim 1, in which said housing comprises a top wall terminating at one end adjacent said sheet feeding element, and in which said camera is articulately mounted on said housing so as to be movable between an inoperative position within said housing and an operative position above said top wall adjacent said one end thereof with said film driving element spaced from said sheet feeding element by said distance.

11. The camera of claim 1, in which said elements each comprises rollers, one of said rollers having flanges at each end thereof with respect to which it is independently rotatable, the radius of said flanges exceeding the radius of said one of said rollers by substantially the thickness of the thinnest sheet to be reproduced, the other of said rollers engaging said flanges, and in which said housing comprises a top wall terminating at one end adjacent said sheet feeding roller, said camera being articulately mounted on said housing so as to be movable between an inoperative position within said housing and an operative position above said top wall adjacent said one end thereof with one of said rollers engaging the flanges associated with the other of said rollers.

12. The camera of claim 1, in which said film driving element comprises a transparent roller adapted to engage the sheet to be reproduced, said camera comprising an optical reproducing system comprisng an illumination means and light guiding means arranged so that the light from said illumination means passes through said transparent roller to the sheet being reproduced and then is reflected from said sheet through said roller to the film in said camera.

13. The camera of claim 12, in which said roller is provided with a ring area adjacent an end thereof adapted to have indicia written thereon, the optical system in said camera being such that light which passes through said ring area and reaches the film in the camera passes through substantially only the sheet-engaging surface of said ring area.

14. In combination, a camera comprising an optical system for reproducing a sheet passed under said camera, means in said camera for feeding film, and film feed synchronizing means operatively connected to said film feeding means and operatively engageable with a sheet to be reproduced for actuating said film feeding means in synchronism with the passage of said sheet relative to said camera and including a film driving element engageable with said sheet, said camera thereby being capable of independent manual use, a housing, a power drive mounted in said housing, said camera being articulately mounted on said housing for movement between an inoperative position within said housing and an operative position extending from said housing, and disconnectable means for drivingly connecting said power drive and said film feeding means, said disconnectable means including parts which operatively engage one another to establish said connection when said camera is in said operative position and which are operatively disengaged to disconnect said connection when said camera is in said inoperative position.

15. The camera of claim 14, in which said housing comprises a top wall terminating at one end adjacent an exposed portion of said power drive, said camera when in operative position extending above said top wall adjacent said one end thereof and with its film feeding means operatively connected to said power drive portion.

16. A camera for reproducing a sheet moved relative thereto comprising a transparent roller adapted to engage the sheet to be reproduced, said roller being provided with a ring area adjacent an end thereof adapted to have indicia applied thereto, and an optical reproducing system comprising an illumination means and light directing means arranged so that the light from said illumination means passes from the sheet through said roller to the film in said camera, the optical system in said camera being such that the light which comes from said ring area and reaches the film in the camera comes from substantially that portion of said ring area which, at any given moment, engages the sheet to be reproduced.

17. A camera for reproducing sheets or the like comprising a housing, a rotatable sheet feeding roller in said housing, a camera operatively positionable with respect to said housing and comprising means for feeding film, a rotatable film driving roller operatively associated with said film feeding means for driving said film feeding means whenever said film driving element is moved, said sheet feeding roller and said film driving roller, when said camera and said housing are operatively relatively positioned, being normally operatively disconnected from one another, each of said rollers being formed of alternating portions of greater and lesser diameter, the portions of greater diameter of each roller being opposite and having a smaller width than the portions of lesser diameter of the other roller and freely fitting between the portions of greater diameter of the other roller, whereby when said sheet is introduced between said rollers said sheet engages and operatively connects both of said rollers, said feeding roller thus driving said sheet and said film driving roller.

18. A camera for reproducing a sheet moved relative thereto comprising a transparent roller adapted to engage the sheet to be reproduced, said roller being provided with a ring area adjacent an end thereof adapted to have indicia applied thereto, and an optical reproducing system in said camera comprising an illumination means and light guiding means arranged so that the light from said illumination means passes through said roller to said sheet and then from the sheet through said roller to the film in said camera, said optical system being such that light which comes from said ring area and reaches the film in said camera comes from substantially that portion of said ring area which, at any given moment, engages the sheet to be reproduced.

19. A camera for reproducing a document moved relative thereto comprising a transparent roller adapted to engage a document to be reproduced, means for feeding film past a film exposure station, an optical reproducing system comprising an illumination means and light guiding means including a lens arranged so that light from said illumination means passes through said roller to said document and then from the document through said roller and said lens to said film reproducing station, there producing on said film an image of a portion of said document, and an operative connection between said film feeding means and said transparent roller, whereby said film is moved in synchronism with said roller.

20. A unitary camera assembly comprising a casing, an optical system carried by said casing for reproducing a document which is adapted to be moved relative thereto through the field of said optical system, a film driving element in said casing engageable with said document as the latter is moved relative to said camera assembly, film feeding means in said camera operatively connected to said driving element for feeding film in synchronism with the movement of said driving element, and, in combination with said unitary camera assembly, a housing separate from said camera assembly in which housing is mounted a power drive which is operatively connectable to said driving element in said camera casing, said camera assembly being detachably mounted on said housing, said camera assembly, when operatively mounted with respect to said housing, having its film feeding means thus operatively connectable to said power drive, said camera assembly, when detached from said housing, being capable of independent manual use in the reproduction of documents moved relative thereto.

References Cited in the file of this patent
UNITED STATES PATENTS

| | | |
|---|---|---|
| 2,194,808 | Pooley | Mar. 26, 1940 |
| 2,198,115 | John | Apr. 23, 1940 |
| 2,251,570 | Hessert | Aug. 5, 1941 |
| 2,282,337 | Mies et al. | May 12, 1942 |
| 2,403,711 | Egan | July 9, 1946 |
| 2,616,344 | Patience et al. | Nov. 4, 1952 |
| 2,676,513 | Engstrom | Apr. 27, 1954 |